Figure 2:
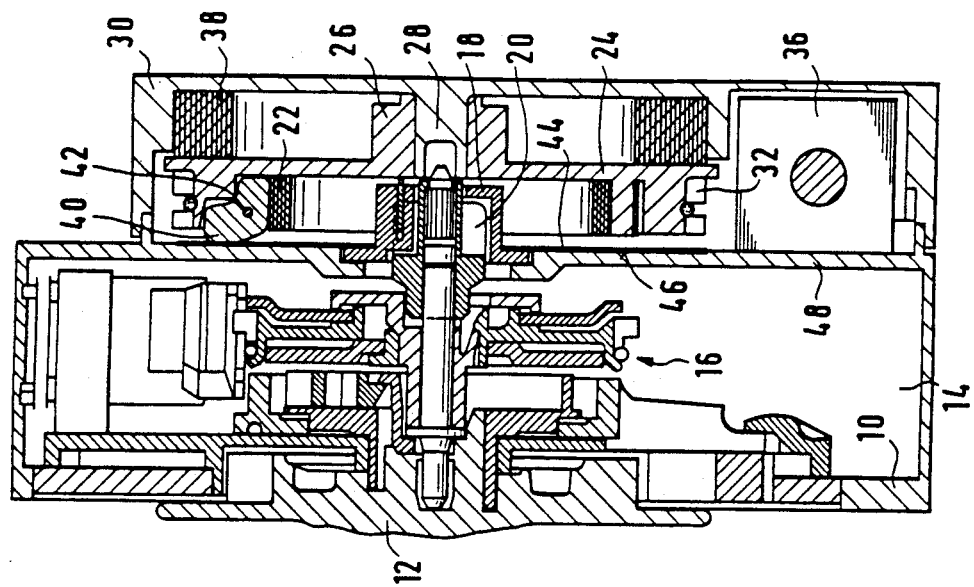

United States Patent [19]

Ebner et al.

[11] Patent Number: 4,989,804
[45] Date of Patent: Feb. 5, 1991

[54] BELT RETRACTOR FOR SAFETY-BELT RESTRAINING SYSTEMS IN MOTOR VEHICLES

[75] Inventors: Ralf Ebner, Gschwend; Bernhard Kaufmann, Schechingen, both of Fed. Rep. of Germany

[73] Assignee: TRW Repa GmbH, Fed. Rep. of Germany

[21] Appl. No.: 434,011

[22] Filed: Nov. 9, 1989

[30] Foreign Application Priority Data

Nov. 10, 1988 [DE] Fed. Rep. of Germany ....... 3838175

[51] Int. Cl.$^5$ ............................................ B65H 75/48
[52] U.S. Cl. .................................................. 242/107
[58] Field of Search ................. 242/107, 107.1, 107.3, 242/107.7, 107.4, 107.4 R, 107.4 B

[56] References Cited

U.S. PATENT DOCUMENTS

| | | | |
|---|---|---|---|
| 3,915,402 | 10/1975 | Takada | 242/107.4 R |
| 4,063,777 | 12/1977 | Takada | 242/107.4 B X |
| 4,088,281 | 5/1978 | Close | 242/107.4 R X |
| 4,162,772 | 7/1979 | Shimogawa et al. | 242/107 |
| 4,212,435 | 7/1980 | Kawaharazaki | 242/107 |
| 4,303,208 | 12/1981 | Tanaka | 242/107 |
| 4,382,563 | 5/1983 | Morita | 242/107 |
| 4,383,658 | 5/1983 | Morita | 242/107 |
| 4,386,744 | 6/1983 | Higbee | 242/107.7 |
| 4,711,408 | 12/1987 | Mori | 242/107 |
| 4,722,495 | 2/1988 | Meredith | 242/107.3 |

FOREIGN PATENT DOCUMENTS 2923691 12/1979 Fed. Rep. of Germany ... 242/107.4 R

Primary Examiner—William A. Cuchlinski, Jr.
Assistant Examiner—Joseph A. Rhoa
Attorney, Agent, or Firm—Tarolli, Sundheim & Covell

[57] ABSTRACT

A safety belt retractor is provided with a dual-tension comfort function. Between the belt reel and housing a retractor spring and an auxiliary spring of weaker spring force than said retractor spring are connected functionally in series via a ratchet wheel. The rotation of said ratchet wheel is selectively blockable by a pawl. The transition between diminished and undiminished tension in the webbing takes place gently, jerk-free and silently because the rotation of the ratchet wheel is inhibited by a brake means as long as the auxiliary spring is not completely or at least almost completely tensioned. Said brake means includes lever-like engagement elements which are pivotally mounted on the ratchet wheel and which are moved by the pressure exerted by the outer periphery of the auxiliary spring in the axial direction to activate a friction brake.

10 Claims, 1 Drawing Sheet

BELT RETRACTOR FOR SAFETY-BELT RESTRAINING SYSTEMS IN MOTOR VEHICLES

The present invention relates to a safety belt retractor for vehicles and, in particular, a safety belt retractor comprising a combined retractor spring effective between a base member and a belt reel taking up the webbing, the combined retractor spring providing a dual-tension comfort function.

Safety belt retractors are known in numerous constructions.

To increase the belt fastening percentages it is desirable to minimize as far as possible the pressure exerted by the fastened belt on the vehicle occupant. This is achieved in principle by a relatively weakly dimensioned retractor spring. The retractor spring however must be made strong enough to take up the webbing completely and reliably when the belt is unfastened and this limits the possibilities of reducing the belt tension in the fastened belt.

It has already been proposed to reduce the force of the retractor or takeup spring by various measures after the safety belt has been applied. For example, it is possible to cause an auxiliary spring to act against the retractor spring after determining on the basis of specific criteria that the belt is fastened. Another possibility is to interpose a force-reducing gearing selectively between the retractor spring and belt reel. The mechanisms required for this are however complex and involved.

The invention provides a belt retractor of the dual-tension type in which with simple means a reduction of the belt tension after fastening of the safety belt is achieved, the switching between reduced and unreduced belt tension taking place gently without jerks.

This is achieved according to the invention by a safety belt retractor wherein a rotatably mounted ratchet wheel is arranged functionally between the retractor spring and the belt reel, the ratchet wheel being drivingly connected to one end of the retractor spring, and a spiral auxiliary spring of waker spring force than the retractor spring being operative between the ratchet wheel and the belt reel, the ratchet wheel cooperating with a pawl which locks or releases the rotational movement of the ratchet wheel in dependence upon a control criterion; associated with the ratched wheel is a brake means which retards the rotation thereof relatively to the housing and the function of which is controlled by the auxiliary spring in such a manner that the brake means is activated at least when the auxiliary spring is relaxed and is inactive when the auxiliary spring is tensioned.

In the belt retractor according to the invention the retractor spring and the auxiliary spring lie functionally in series between the housing of the belt retractor and the belt reel as long as the safety belt is not fastened. The fastening of the safety belt can for example be determined by a switch in the belt lock which is actuated by the insert tongue. Since the retractor spring is made stronger than the auxiliary spring the latter is completely tensioned by the retractor spring so that it is extended "to block" and the force generated by the retractor spring engages the belt reel undiminished. However, as soon as the safety belt is fastened the ratchet wheel is held non-rotatably, for example by means of an electromagnet which drives the pawl into the teeth of the ratchet wheel so that only the more weakly dimensioned auxiliary spring is operative between the housing and the belt reel and the belt tension is thus reduced to increase the wearing comfort.

Now, when the safety belt is unfastened again the pawl releases the ratchet wheel, whereupon the retractor spring is effective with undiminished force between the housing and belt reel so that the auxiliary spring is tensioned.

Now, to ensure a gentle jerk-free silent transition between reduced and unreduced belt tension in the operation described above the brake means is activated until the auxiliary spring is completely tensioned. The brake means inhibits the rotational movement of the ratchet wheel taking place under the force of the retractor spring until the auxiliary spring is completely tensioned, i.e. is extended "to block". It is thus avoided that under the action of the force originating from the retractor spring the ratchet wheel is rapidly accelerated and thereafter, when the auxiliary spring is tensioned, the rotation of the ratchet wheel is abruptly retarded when the turns of the auxiliary spring lie close on each other, which would lead to a jolt and considerable noise development.

The belt retractor according to the invention is distinguished in that it implements the "comfort function" described with the simplest means which moreover operate very reliably and are of low wear.

In an advantageous embodiment of the belt retractor according to the invention the brake means responds to the outer diameter of the auxiliary spring in that the auxiliary spring with its outer periphery actuates a mechanism which governs the function of the brake means. Preferably, said mechanism comprises at least one engagement member which is mounted on the ratchet wheel and on which the outer periphery of the auxiliary spring bears at least in the incompletely tensioned state thereof and which is movable by the force of the auxiliary spring into an activation position in which said engagement member produces a frictional engagement with the housing-fixed member. The outer diameter of the auxiliary spring is a simple criterion for determining whether the auxiliary spring is tensioned or relaxed. It is particularly expedient if the engagement member when the auxiliary spring is completely tensioned, i.e. when its turns lie closely on each other, is detached from the outer periphery of the auxiliary spring and returns automatically into an inactivated position in which it does not produce any frictional connection with the housing-fixed member so that the brake means is inoperative. Thus, although the belt retractor according to the invention comprises apart from the switching between unreduced and reduced belt tension an additional function, i.e. the selective activation of a brake means which allows the transition between reduced and unreduced belt tension to take place gently, jerk-free and silently, hardly any additional components are required for the control of this function.

To keep the brake means activated until the auxiliary spring is completely or almost completely tensioned the auxiliary spring is strengthened in the region of its outermost turn or turns so that the turns lying within this region are contracted before the outer periphery of the auxiliary spring detaches from the engagement element.

Figure 1:
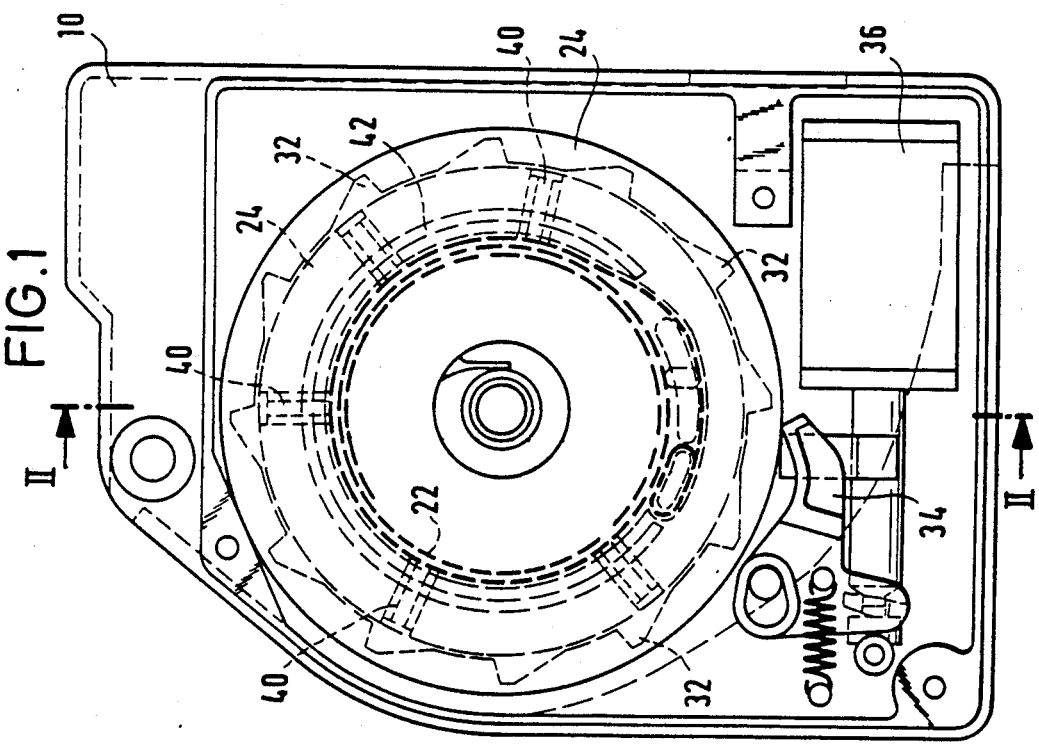

Further advantages and features of the invention will be apparent from the following description of a preferred embodiment and from the drawings to which reference is made and in which:

FIG. 1 shows a schematic side view of the embodiment of the belt retractor described and FIG. 2 is a sectional view of said belt retractor along the line II—II of FIG. 1.

In a housing 10 of the belt retractor a belt reel 12 is rotatably mounted. Via a mechanism which is accommodated in an intermediate chamber 14 and which is not necessary to the understanding of the invention and thus will not be described, the belt spool 12 is non-rotatably connected to a driver sleeve 18 which is rotatably mounted on the housing. Said driver sleeve 18 is coupled in form-locking manner to a member 20 connected non-rotatably to the belt reel 12. The inner end of a spiral auxiliary spring 22 engages the outer periphery of the driver sleeve 18, the convolutions or turns of said spring coaxially surrounding the driver sleeve 18. The outer end of said auxiliary spring 22 is connected to a ratchet wheel 24 which is rotatably mounted by means of a hub 26 on an integrally formed pin 28 of a housing cap 30. The ratchet wheel 24 comprises at its outer periphery uniformly distributed ratchet teeth 32. Said ratchet teeth 32 cooperate with a pawl 34 which is rotatably mounted on the housing and is actuated by an electromagnet 36. The electromagnet 36 is in turn controlled by a switch which is arranged in the belt lock (not shown) in such a manner that it is actuated by insertion of the insert tongue into the belt lock.

At the outer periphery of the hub 26 of the ratchet wheel 24 the inner end of a spiral retractor spring 38 engages. The outer end of said retractor or takeup spring 38 is fixed to the housing cap 30. The retractor spring 38 and the auxiliary spring 22 are thus connected functionally in series via the ratchet wheel 24 between the housing cap 30 and the belt reel 12 as long as the ratchet wheel 24 is freely rotatable. The retractor spring 38 is however made considerably stronger than the auxiliary spring 22 so that it tensions the latter until the turns thereof lie closely on each other. In this state the unreduced force of the retractor spring 38 is then operative between the housing and belt reel 12.

When the electromagnet 36 is activated by actuation of the switch in the belt lock the armature thereof pivots the pawl 34 with its pawl tooth into the ratchet teeth 32 of the ratchet wheel 24 so that the rotation of the latter is blocked. Since the ratchet wheel 24 is now held fixedly on the housing only the force of the auxiliary spring 22 is then effective between the housing and belt reel 12, i.e. a force which is considerably reduced compared with the force of the retractor spring 38 and consequently the tension in the webbing is correspondingly diminished.

On unfastening the safety belt the pawl 34 is released by the electromagnet 36 and moved under the action of a return spring out of the path of the ratchet teeth 32 so that the ratchet wheel 24 is now again freely rotatable. The retractor spring 38 now tends to set the ratchet wheel 24 in rotation and thereby tension the auxiliary spring 22 until its turns bear closely on each other. As soon as this state is reached the undiminished force of the retractor spring 38 is again effective between the belt reel and housing.

Now, to ensure that this transition between reduced and unreduced belt tension takes place gently, jerk-free and silently, a brake means is provided which ensures that the rotation of the ratchet wheel 24 is inhibited until the auxiliary spring 22 is completely tensioned. An excessively high acceleration of said ratchet wheel 24 with correspondingly abrupt retardation when the auxiliary spring 22 is completely tensioned is thus avoided.

Said brake means consists in the embodiment described of a plurality of engagement elements which are uniformly distributed over the side face of the ratchet wheel 24 facing the belt reel 12 and are mounted on said ratchet wheel 24. In FIG. 2 one of these engagement elements 40 is shown. Said engagement element 40 forms a two-armed lever which is pivotally mounted on the ratchet wheel 24 by means of a wire ring 42 held on the ratchet wheel 24. The first approximately axial arm of the engagement element 40 bears on the outer periphery of the auxiliary spring 22 as long as the latter is not tensioned. The second approximately radial arm of the engagement element 40 forms an engagement surface which faces the belt reel 12 and which cooperates drivingly with a friction disc 44 which is rotatably mounted on the driver sleeve 18. Said friction disc 44 comprises on its side remote from the engagement element 40 a friction face which is in frictional engagement with an opposite friction face 46 of a housing wall 48. By the pressure exerted by the outer periphery of the auxiliary spring 22 the engagement element 40 is pivoted with its radial arm approximately in the axial direction against the friction disc 44, the friction surfaces between the friction disc and housing wall 48 being pressed against each other. FIG. 2 thus shows the activated state of the brake means.

This activated state of the brake means is retained until the auxiliary spring 22 is completely or almost completely tensioned. For this purpose the auxiliary spring 22 is strengthened in the region of its outer periphery or its outer turn or turns. This can be done in simple manner by inserting a leaf spring in this region between two turns of the auxiliary spring 22. The brake means thus remains activated until the transition between the reduced and unreduced belt tension has been completed so that a gentle jerkfree and silent transition is ensured.

In a further embodiment not described in detail the engagement elements are pressed directly radially outwardly by the pressure of the auxiliary spring 22 in the relaxed state thereof so that they come into engagement for example with their outer periphery with a housing-fixed frictional surface which surrounds the ratchet wheel 24.

We claim:

1. A safety belt retractor for vehicles, comprising:
a base member;
a reel for taking up webbing of said safety belt;
a ratchet wheel mounted for rotation relative to said base member and to said reel;
a retractor spring having a first end connected to said ratchet wheel and a second end connected to said base member;
an auxiliary spiral spring having a first end connected to said ratchet wheel and a second end connected to said reel, said auxiliary spring being of weaker spring force than said retractor spring;
a pawl pivotally mounted on said base member and cooperating with ratchet teeth of said ratchet wheel to stop or enable rotation of said ratchet wheel in response to a control means; and
brake means mounted on said ratchet wheel to counteract rotation of said ratchet wheel with respect to said base member, said brake means being adapted to be actuated when said auxiliary spiral spring is relaxed and to be released when said auxiliary spiral spring is tensioned, by sensing the outer diameter of said auxiliary spiral spring.

2. The safety belt retractor according to claim 1, wherein said auxiliary spring has an outer periphery engaging a mechanism which governs the braking function of said brake means.

3. The safety belt retractor according to claim 1, wherein a plurality of brake members for engaging the outer periphery of said auxiliary spiral spring which are distributed over a circular face of one side of said ratchet wheel are fixed on said ratchet wheel for rotation therewith.

4. The safety belt retractor according to claim 1, wherein said auxiliary spiral spring is strengthened in the region of at least one of its outer layers so that the convolutions disposed inwardly of said region are contracted on tensioning of said auxiliary spiral spring before the outer periphery of said auxiliary spring disengage from said engagement element.

5. A safety belt retractor for vehicles, comprising:
a base member;
a reel for taking up webbing of said safety belt;
a ratchet wheel mounted for rotation relative to said base member and to said reel;
a retractor spring having a first end connected to said ratchet wheel and a second end connected to said base member;
an auxiliary spiral spring having a first end connected to said ratchet wheel and a second end connected to said reel, said auxiliary spring being of weaker spring force than said retractor spring;
a pawl pivotally mounted on said base member and cooperating with ratchet teeth of said ratchet wheel to stop or enable rotation of said ratchet wheel in response to a control means; and
brake means mounted on said ratchet wheel to counteract rotation of said ratchet wheel with respect to said base member, said brake means being adapted to be actuated when said auxiliary spiral spring is relaxed and to be released when said auxiliary spiral spring is tensioned, by sensing the outer diameter of said auxiliary spiral spring;
said brake means comprising at least one engagement member which is mounted on said ratchet wheel and on which the outer periphery of said auxiliary spiral spring bears at least in an incompletely tensioned state thereof and which is movable by the force of said auxiliary spring into an activating position in which said engagement member produces a frictional engagement with a fixed member.

6. The safety belt retractor according to claim 5, wherein said engagement member, when said auxiliary spiral spring is fully tensioned, is detached form the outer periphery of said auxiliary spiral spring and is moved automatically into an inactivated position in which it does not produce any frictional engagement with said fixed member.

7. The safety belt retractor according to claim 6, wherein said engagement element is pressed in an axial direction into said activating position by pressure exerted by the outer periphery of said auxiliary spiral spring.

8. The safety belt retractor according to claim 7, wherein said engagement element is formed as a two-armed lever which is pivotally mounted on said ratchet wheel and has a first substantially axial arm which bears on the outer periphery of said auxiliary spiral spring and a second substantially radial arm with an engagement surface which, by pivoting of said engagement element under the action of pressure exerted by the periphery of said auxiliary spiral spring, is moved in an axial direction towards a fixed frictional surface.

9. The safety belt retractor according to claim 8, wherein a freely rotatably mounted friction disc is arranged between said engagement surface of said second arm of the engagement element and said fixed frictional surface.

10. The safety belt retractor according to claim 5, wherein said engagement member is pressed by pressure exerted by the outer periphery of said auxiliary spiral spring outwardly in a radial direction into said activating position in which it establishes a frictional connection between said ratchet wheel and a fixed friction surface surrounding said ratchet wheel.

* * * * *

UNITED STATES PATENT AND TRADEMARK OFFICE
CERTIFICATE OF CORRECTION

PATENT NO. : 4,989,804

DATED : February 5, 1991

INVENTOR(S) : Ralf Ebner, and Bernhard Kaufmann

It is certified that error appears in the above-identified patent and that said Letters Patent is hereby corrected as shown below:

Column 6, Line 11, Claim 6, change "form" to --from--.

Signed and Sealed this

Thirtieth Day of June, 1992

Attest:

DOUGLAS B. COMER

*Attesting Officer*　　*Acting Commissioner of Patents and Trademarks*